J. B. SILENGO.
ICE CREAM FREEZER.
APPLICATION FILED FEB. 19, 1915.
1,163,113.
Patented Dec. 7, 1915.
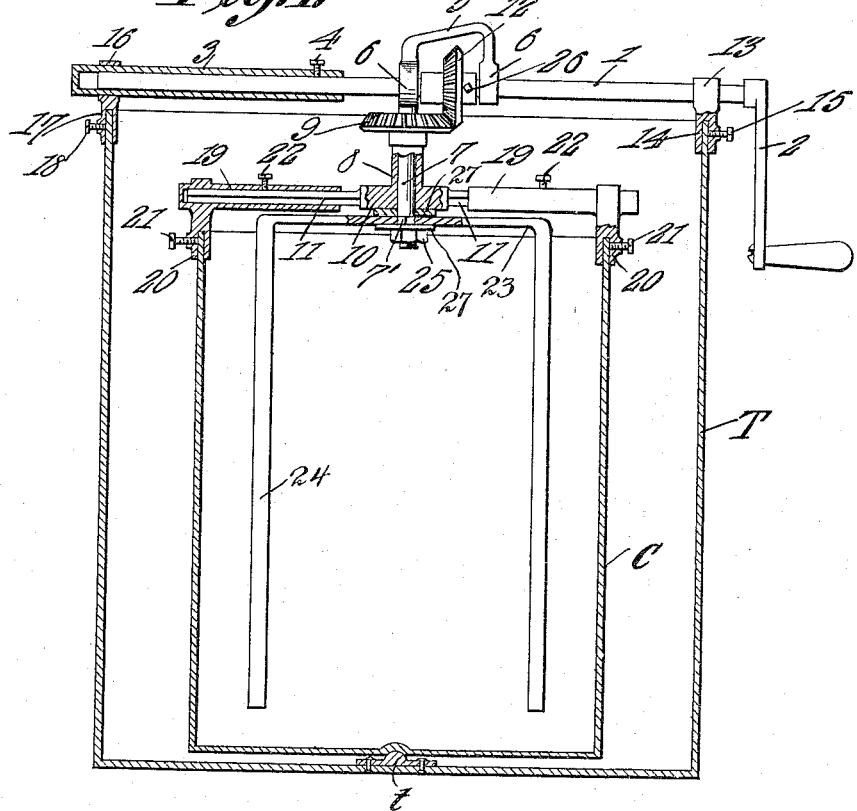
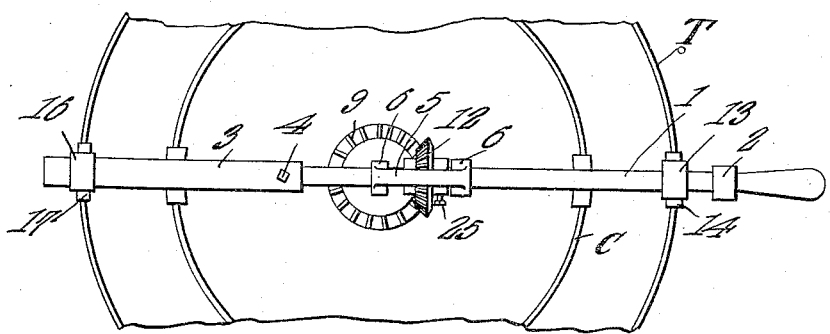
Witnesses
J. B. Silengo,
Inventor
by
Attorneys

UNITED STATES PATENT OFFICE.

JOHN B. SILENGO, OF BURKE, CALIFORNIA.

ICE-CREAM FREEZER.

1,163,113.  Specification of Letters Patent.  Patented Dec. 7, 1915.

Application filed February 19, 1915. Serial No. 9,306.

*To all whom it may concern:*

Be it known that I, JOHN B. SILENGO, a citizen of the United States, residing at Burke, in the county of Sonoma and State of California, have invented a new and useful Ice-Cream Freezer, of which the following is a specification.

This invention relates to ice cream freezers and more particularly to mechanism designed for use in connection with tubs and cans or containers of different sizes so that one size of operating mechanism can be provided for the various sizes of freezers to be used.

A further object is to provide operating mechanism which, when not in use, can be readily detached from the tub and from the can or container so that said parts can be used for other purposes than that of an ice cream freezer.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a vertical section through an ice cream freezer having the present improvements combined therewith. Fig. 2 is a plan view of a portion of the structure shown in Fig. 1.

Referring to the figures by characters of reference 1 designates a drive shaft provided, at one end, with any suitable means for rotating it, such as a crank 2. The other end of this shaft extends into a tubular extension 3 and this extension may be secured to the shaft in any desired manner, as by means of a set screw 4. A yoke 5 is mounted on the shaft 1 and is provided with spaced eyes 6 through which the shaft extends. Extending downwardly from one of these eyes or bearings is a stem 7 on which a sleeve 8 is mounted for rotation, the upper portion of the sleeve being provided with a bevel gear 9 while the lower portion of the sleeve has an enlargement 10 from which project oppositely extending arms 11, these arms being angular in cross section. A gear 12 is secured to the shaft 1 between the eyes 6 and meshes with gear 9.

Shaft 1 is mounted for rotation within a bearing 13 having a depending fork 14 carrying a set screw 15. Another bearing 16 is engaged by the tubular extension 3 and is likewise provided with a forked extension 17 having a set screw 18.

Slidably mounted on the arms 11 are sleeves 19 each of which is provided, adjacent its outer end, with a depending forked portion 20 provided with a set screw 21. The sleeves 19 can be held against movement on the arms 11 by set screws 22 or in any other suitable manner. A cross strip 23 is mounted on the squared lower end portion 7' of stem 7 and carries, at its ends, depending arms 24. The lower end of the stem 7 is engaged by a nut 25 whereby the sleeve 8 is supported on the stem. Spacing washers 27 may be interposed between the cross strip 23 and the enlargement 10 and nut 25 respectively.

The mechanism herein described is designed to be used in connection with tubs and with cans or receptacles of different sizes. In the drawings a tub has been indicated at T while a can has been indicated at C, a suitable bearing *t* being provided upon the bottom of the tub at the center thereof for engagement by the bottom of the can C. The sleeves 19 are adjusted longitudinally so as to bring the forked portions 20 into position for receiving diametrically opposed portions of the wall of the can C, after which the said forked portions are clamped upon the can by means of the screws 21. The shaft 1 is then adjusted longitudinally within the extension 3 and the forked members 14 and 17 adjusted so as to engage the wall of a tub at diametrically opposed points after which the screws 15 and 18 are used for clamping the forked extensions in position. Gear 12 is shifted along shaft 1 so as to allow the stem 7 to be properly centered above the can C after which said gear is secured to shaft 1 in any desired manner, as by means of a set screw 26 although it is to be understood that, if preferred, gear 12 can be feathered on the shaft 1. The arms 24 will be held stationary by the head 23 and stem 7 while can C is being rotated.

What is claimed is:—

1. Operating mechanism for ice cream freezers, including a stem, an extensible shaft journaled therein, bearings engaged by the shaft and having tub gripping portions, a sleeve mounted for rotation on the stem, means for transmitting motion to the sleeve from the shaft, arms radiating from the sleeve, said arms being extensible, and can gripping elements carried by the arms.

2. The combination with a yoke having a stem depending therefrom, of a telescopic shaft journaled within the yoke, bearings engaged by the shaft and having depending tub engaging portions, a sleeve journaled on the stem, gearing for transmitting motion from the shaft to the sleeve, radial arms extending from the sleeve, said arms being made up of telescopically connected sections, and depending can engaging portions upon the arms.

3. The combination with a yoke having a stem depending therefrom, of a telescopic shaft journaled within the yoke, bearings engaged by the shaft and having depending tub engaging portions, a sleeve journaled on the stem, gearing for transmitting motion from the shaft to the sleeve, radial arms extending from the sleeve, said arms being made up of telescopically connected sections, depending can engaging portions upon the arms, and spaced depending arms connected to and held against rotation by the depending stem.

In testimony that I claim the foregoing as my own, I have hereto affixed my signature in the presence of two witnesses.

JOHN B. SILENGO.

Witnesses:
CHAS. LUARELLI,
WM. READ.

Copies of this patent may be obtained for five cents each, by addressing the "Commissioner of Patents, Washington, D. C."